(12) United States Patent
Magrini

(10) Patent No.: US 7,603,928 B2
(45) Date of Patent: Oct. 20, 2009

(54) ADJUSTABLE STEERING COLUMN FOR A VEHICLE

(75) Inventor: Sergio Magrini, Modena (IT)

(73) Assignee: CNH America LLC, New Holland, PA (US)

( * ) Notice: Subject to any disclaimer, the term of this patent is extended or adjusted under 35 U.S.C. 154(b) by 771 days.

(21) Appl. No.: 11/077,473

(22) Filed: Mar. 10, 2005

(65) Prior Publication Data

US 2005/0199086 A1    Sep. 15, 2005

(30) Foreign Application Priority Data

Mar. 11, 2004   (IT)   ................. TO2004A0159

(51) Int. Cl.
 *B62D 1/18*   (2006.01)
(52) U.S. Cl. ...................................... 74/493
(58) Field of Classification Search ............. 74/484 R, 74/485, 486, 469, 491, 492, 493, 496; 123/319; 280/89.11, 89.12, 771, 775, 777, 779; 180/78, 180/400
See application file for complete search history.

(56) References Cited

U.S. PATENT DOCUMENTS

| | | | |
|---|---|---|---|
| 1,721,290 A * | 7/1929 | Badertscher | ................. 477/202 |
| 3,198,030 A | 8/1965 | Miller | |
| 4,331,003 A | 5/1982 | Peterson | |
| 4,392,670 A | 7/1983 | Schultz | |
| 4,463,624 A | 8/1984 | Shibata | |
| 4,856,927 A * | 8/1989 | Cusati | ................. 403/104 |
| 4,946,195 A * | 8/1990 | Ioka et al. | ................. 280/777 |
| 5,036,942 A | 8/1991 | Loewen | |
| 5,419,581 A | 5/1995 | Schafer et al. | |
| 5,449,199 A | 9/1995 | Heinrichs | |
| 5,464,251 A * | 11/1995 | Daumal Castellon | ....... 280/777 |
| 5,806,890 A | 9/1998 | Sugiki et al. | |
| 6,189,405 B1 * | 2/2001 | Yazane | ................. 74/493 |
| 6,279,953 B1 * | 8/2001 | Cartwright | ................. 280/779 |

FOREIGN PATENT DOCUMENTS

| | | |
|---|---|---|
| EP | 0911244 | 4/1999 |
| EP | 1048547 | 11/2000 |
| EP | 0841236 | 8/2002 |

* cited by examiner

*Primary Examiner*—Vicky A Johnson
(74) *Attorney, Agent, or Firm*—Patrick M. Sheldrake; John William Stader; Michael G. Harms

(57) ABSTRACT

A steering column includes a hollow shaft, a steering shaft, a steering wheel and a joint. The hollow shaft includes an upper section and a lower section, the upper and lower sections being pivotable relative to one another about a pivot axis. The steering shaft includes a first and a second section, each of the first and second sections of the steering shaft being journalled in the upper and lower sections, respectively, of the hollow shaft. The steering wheel is supported on the first section of the steering shaft and the joint interconnects the first and second sections of the steering shaft. The center of the joint is offset from the pivot axis of the upper and lower sections of the hollow shaft.

6 Claims, 2 Drawing Sheets

ADJUSTABLE STEERING COLUMN FOR A VEHICLE

FIELD OF THE INVENTION

The present invention relates to a steering column for a vehicle which allows the rake or angle of the steering wheel to be adjusted.

BACKGROUND OF THE INVENTION

It is known to form a steering column in two sections that can be pivoted relative to one another to allow adjustment of the position and rake of the steering wheel. A steering shaft connected to the steering wheel and journalled within the steering column is also formed in two sections which can pivot relative to one another with the steering column. A universal joint connects the sections of the steering shaft to one another and its center (the point of intersection of the axes of the two sections of the shaft when they are not aligned with one another) lies on the pivot axis of the sections of the steering column.

The two sections of the steering column are connected to one another by a spring and damper cylinder which can be used to lock the sections in any desired position and supports the weight of the steering wheel as its position is being adjusted. In order for the spring and damper cylinder to have the necessary leverage, it is necessary for its points of attachment to the sections of the steering column to lie on a line of action offset from the pivot axis. For this reason, attachment brackets are provided for the spring and damper cylinder which project from the sections of the steering column.

A disadvantage of the known construction is that additional space is required to accommodate the spring and damper cylinder.

SUMMARY OF THE INVENTION

With a view to mitigating the foregoing disadvantage, the preferred embodiment provides a steering column comprising a hollow shaft, a steering shaft, a steering wheel and a joint. The hollow shaft comprises an upper section and a lower section, the upper and lower sections being pivotable relative to one another about a pivot axis. The steering shaft comprises a first and a second section, each of the first and second sections of the steering shaft being journalled in the upper and lower sections, respectively, of the hollow shaft. The steering wheel is supported on the first section of the steering shaft and the joint interconnects the first and second sections of the steering shaft. The center of the joint is offset from the pivot axis of the upper and lower sections of the hollow shaft.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
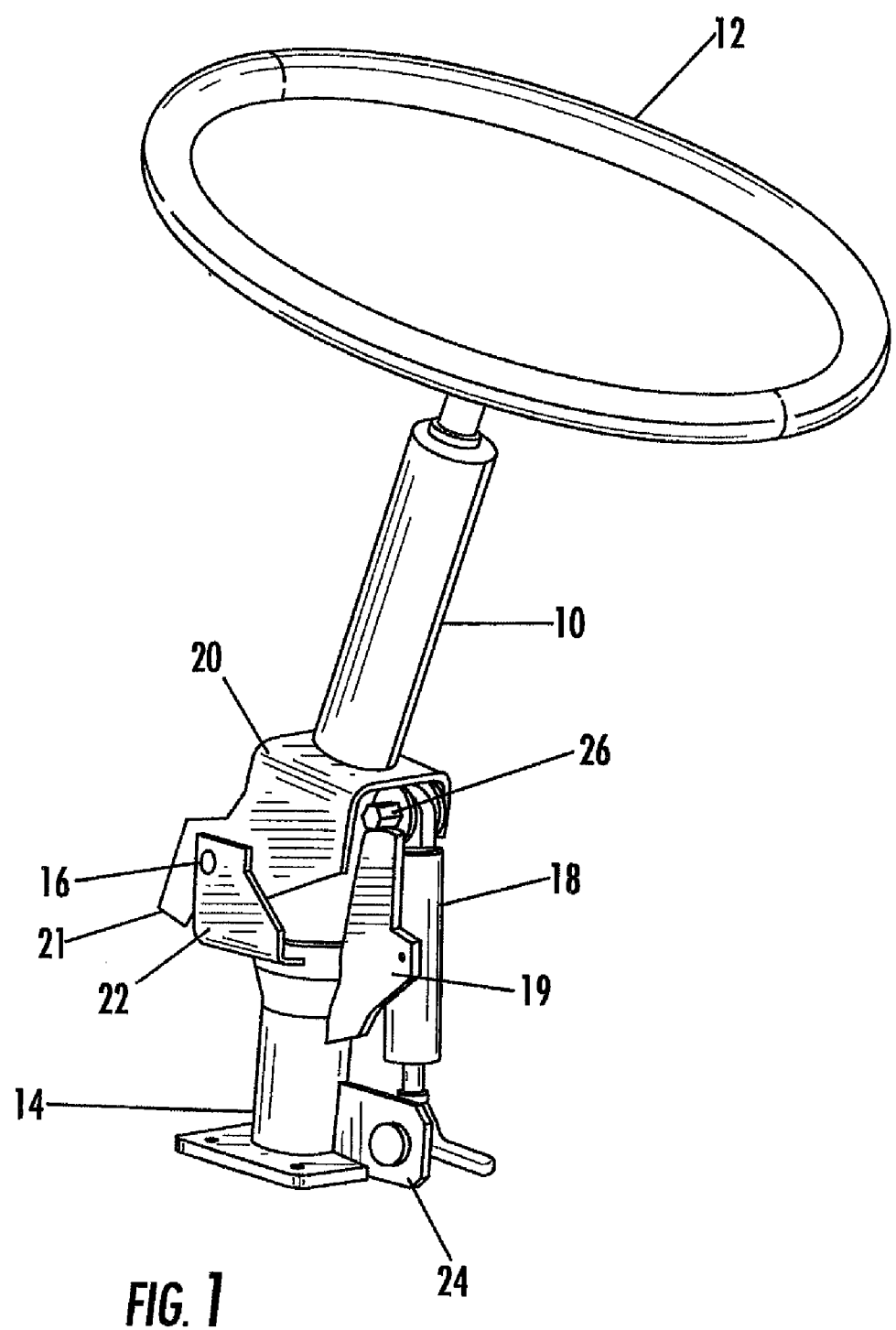
FIG. 1 is schematic perspective view of a steering column according to the preferred embodiment of the invention.

FIG. 1 shows an adjustable steering column made up of a first, or upper, section 10 supporting a steering wheel 12 and a second, or lower, section 14 which is secured to the vehicle chassis. The first section can pivot about pins 16 which connect two U-shaped brackets 20 and 22, welded respectively to the first and the second section of the steering column. A hydraulic spring and damper cylinder 18 extends between a bracket 24 welded to the lower section 14 of the steering column and a pin 26 mounted in the U-shaped bracket 20. The cylinder 18 supports the weight of the upper section 10 of the steering column and the steering wheel 12 during adjustment of their position and can be used to lock the section 10 of the steering column in any desired position. Movement of the steering wheel 12 towards the driver is limited by the pin 26 abutting the upper end of a plate 19 that is welded to the second section 14 of the steering column. Furthermore, a rearward extension 21 of the bracket 20 limits the movement of the steering wheel away from the driver by abutting the rear edge of the bracket 22.

Within the sections 10 and 14 of the steering column, there are journalled two sections of a steering shaft connecting the steering wheel 12 to the vehicle steering mechanism. The two sections are connected to one another by means of a universal joint to allow them to pivot relative to one another.

In prior constructions of such an adjustable steering column, the pivot axis defined by the pins 16 coincides with the centre of the universal joint. By contrast, in the illustrated embodiment of the invention, the pivot axis defined by the pins 16 is intentionally moved to be further away from the line of action of the cylinder 18 than the center of the universal joint in the steering shaft, as this allows the cylinder 18 to be mounted nearer to the steering column so as to take up less space. If the pin 16 is offset sufficiently from the center of the universal joint, then is it possible for the cylinder 18 to be positioned alongside the steering column, instead of being in front of it.

Figure 2:
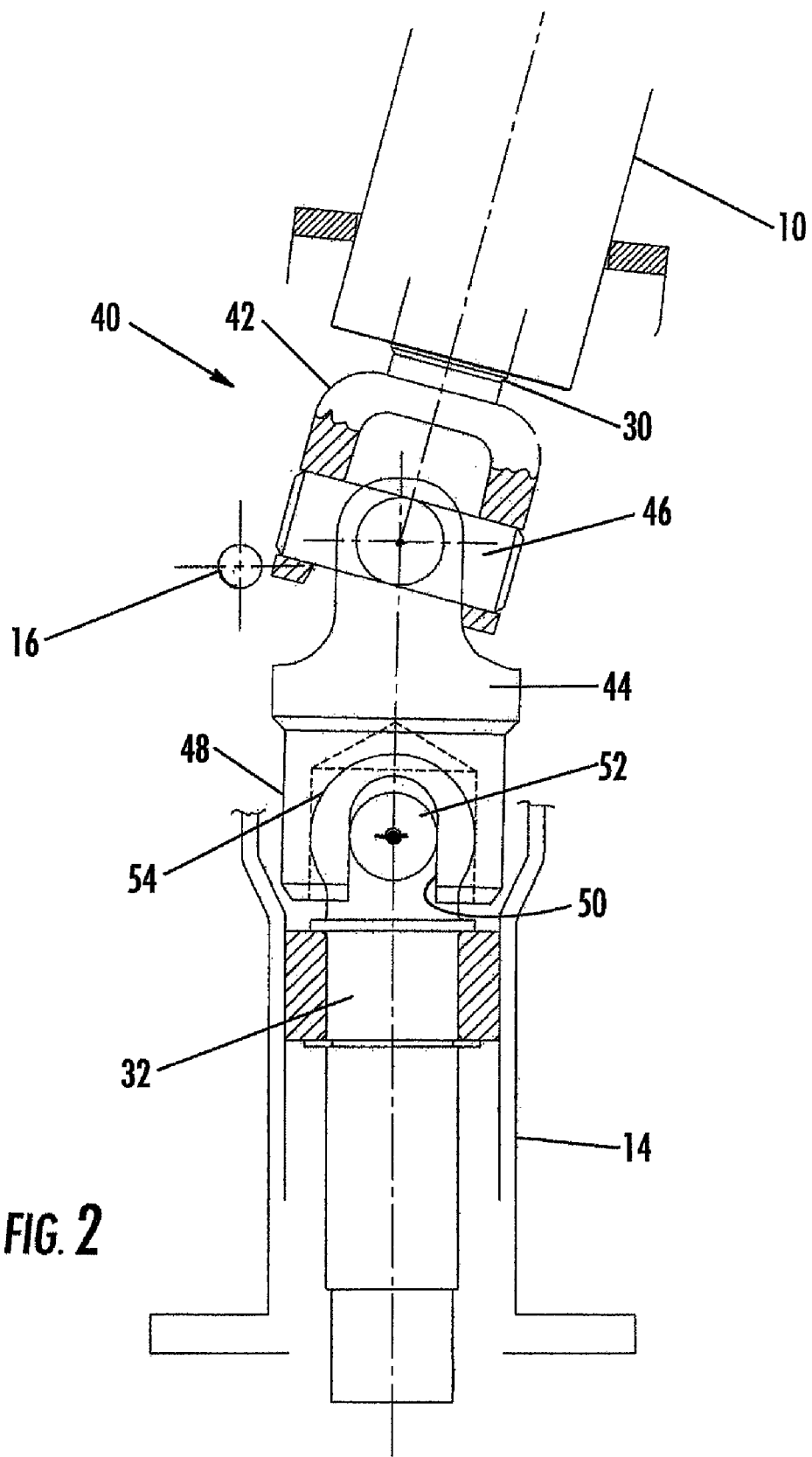
FIG. 2 is a partial section through the steering column.

In FIG. 2, the connection between the two sections 30 and 32 of the steering shaft is shown in detail. A universal joint 40 comprising two forks 42 and 44 and a spider 46 serves to couple the first section 30 of the steering shaft to the second section 32. If the axis of the pins 16 were arranged, as in the prior art, to coincide with the center of the spider 46 there would be no movement of the spider 46 axially relative to the steering wheel and the steering mechanism. The fork 44 could therefore be permanently secured to the second section 32 of the steering shaft. However, as the pivot axis defined by the pins 16 is offset from the center of the spider 46, and as the latter is mounted directly on the first section 30 of the steering shaft, the center of the spider moves in a circle centered on the pivot axis of the pins 16 during adjustment of the position of the steering wheel.

In order to accommodate this movement of the center of the universal joint, its second fork 44 is formed integrally with a link 48 in the form of a tube having two diametrically opposed axially extending slots 50 in its end. The slots 50 receive the ends of a pin 52 mounted in a bore extending transversely through a ball 54 formed at the end of the second section 32 of the steering shaft. The link 48 can tilt relative to the second section 32 of the steering shaft by pivoting about the pin 52 and it can also move axially by the pin 52 sliding in the slots 50.

It will be appreciated that various changes may be made to the described embodiment without departing from the scope of the invention as set out in the appended claims. For example, other forms of coupling, rather than a universal joint, could be used to tilt the steering shafts relative to one another.

The invention claimed is:

1. A steering column comprising:
a hollow shaft comprising an upper section and a lower section, the upper and lower sections being connected by a first pivotal connector, defining a pivot axis, such that the upper and lower sections are pivotable relative to one another about the pivot axis;
a steering shaft comprising a first and a second section, each of the first and second sections of the steering shaft being journalled in the upper and lower sections, respectively, of the hollow shaft;
a steering wheel supported on the first section of the steering shaft;
a second connector having a joint interconnecting the first and second sections of the steering shaft, the joint having a center, wherein the center of the joint is offset rearwardly from the pivot axis of the upper and lower sections of the hollow shaft.

2. The steering column according to claim 1, wherein the steering column is extendable.

3. The steering column according to claim 1,
wherein the joint is a universal joint;
the universal joint comprising two forks and a cross and the centre of the universal joint being offset from the pivot axis of the sections of the steering column and following a circular path centered on said pivot axis when the position of the steering wheel is changed, one of said forks being fixedly connected t a first section of the steering shaft which is connected to the steering wheel and which is of fixed length; and
the second section of the steering shaft having a fixed position relative to said pivot axis of the sections; and
the other of said forks of the universal joint connected for rotation with said second section of the steering shaft by means of an intermediate link integral with said second fork; said intermediate link being configured to both axially move and pivot relative to said second section of the steering shaft when the position of the steering wheel is changed.

4. The steering column according to claim 3, wherein the center of the universal joint remains stationary as the first section of the steering shaft is pivoted.

5. The steering column according to claim 1, wherein the first section of the steering shaft is a fixed length, the joint comprising a first and a second yoke and a spider connecting the first and second yokes, the first yoke including a tube-like end that defines two diametrically opposed axially extending slots, the second section of the steering shaft terminating in a ball, the second section of the steering shaft including a pin adapted to slide in the slots of the tube-like end, whereby the center of the joint rotates about the pivot axis.

6. The steering column according to claim 1, further comprising a spring and damping cylinder connected between the upper and lower sections of the hollow shaft and the cylinder is offset rearward of the center of the joint.

* * * * *